March 26, 1929. A. MATHÉ 1,706,857
APPARATUS FOR THE PRECISE DETERMINATION
OF THE LEVEL OF GLASS IN A FURNACE
Filed Aug. 10, 1926 2 Sheets-Sheet 1

Inventor
Aimé Mathé
by Robert S Brown
Attorney.

March 26, 1929.  A. MATHÉ  1,706,857
APPARATUS FOR THE PRECISE DETERMINATION
OF THE LEVEL OF GLASS IN A FURNACE
Filed Aug. 10, 1926  2 Sheets-Sheet 2

Inventor
Aimé Mathé
by Robert A. Brown
Attorney.

Patented Mar. 26, 1929.

1,706,857

UNITED STATES PATENT OFFICE.

AIMÉ MATHÉ, OF PARIS, FRANCE, ASSIGNOR TO HARTFORD-EMPIRE COMPANY, OF HARTFORD, CONNECTICUT, A CORPORATION OF DELAWARE.

APPARATUS FOR THE PRECISE DETERMINATION OF THE LEVEL OF GLASS IN A FURNACE.

Application filed August 10, 1926, Serial No. 128,506, and in France August 14, 1925.

The present invention relates to apparatus intended to permit the measuring with great precision of the level of glass in a furnace, while the furnace is in operation.

The exact measurement of this level is of great importance in modern tank furnaces which feed machines for drawing sheet glass or machines for making bottles, jars or similar articles, because even a very slight variation of the level of the glass results in modifying the conditions of operation of these machines, making necessary a new regulation for each variation of level.

The estimation of the level by ordinary means, such as marks made on floating blocks, estimation of the distance between the upper edge of the tank and the surface of the glass, and the like, does not provide sufficient certainty, since the exactness of these means depends eventually upon the observer and may vary according to the amount of wearing of the furnace.

The apparatus constituting the object of the present invention permits measuring, at every instant, the level of the glass in the furnace with a precision of the order of one millimetre, the exactness of the reading being independent of the observer. Furthermore, since the apparatus is completely independent of the furnace, its exactness is not influenced by the condition thereof.

This system is characterized by the use of a source of light exterior to the furnace and independent of it, in combination with a telescope or the like with which is observed the image which the light source forms by reflection upon the surface of the pool of glass. The variations of the level of the glass are measured by the relative displacement of the observing instrument and the light source.

The accompanying drawing represents by way of example one way in which the invention may be carried out.

A source of light, for example an electric lamp $a$ having a rectilinear filament disposed horizontally, is placed at one side of the furnace and emits light rays which can penetrate into the furnace when an opening $c$ is uncovered. The rays emitted by the lamp are reflected at $d$ on the surface of the glass and emerge from the furnace through an opening $e$ located at the side opposite to the lamp and in line with the opening $c$. The light may be received by a telescope $f$ placed in any desired position. The telescope $f$ is inclined in a vertical plane at an angle fixed by a collar $g$ on a piece $h$ which is slidable on a vertical guide $i$ that is mounted on a carriage $j$ secured to a wall or fixed in any other manner. The telescope $f$ is provided with a cross hair which gives a line of vision which remains constantly parallel to itself during rising or descending movement. This latter movement is controlled by two knurled wheels $k$—$k^1$, which actuate a small toothed pinion $l$ meshing with a rack $m$ that is integral with the piece $h$. A small lever $n$, working on a cam $n^1$, bears upon the guide $i$, permitting the telescope to be held against movement at the time when a reading is taken. Two pointers $o$ and $p$ are secured to the piece $h$ which carries the telescope, and move over two graduated scales $q$ and $r$ that are fixed on the carriage $j$ and are placed on opposite sides of the telescope.

Figure 1:
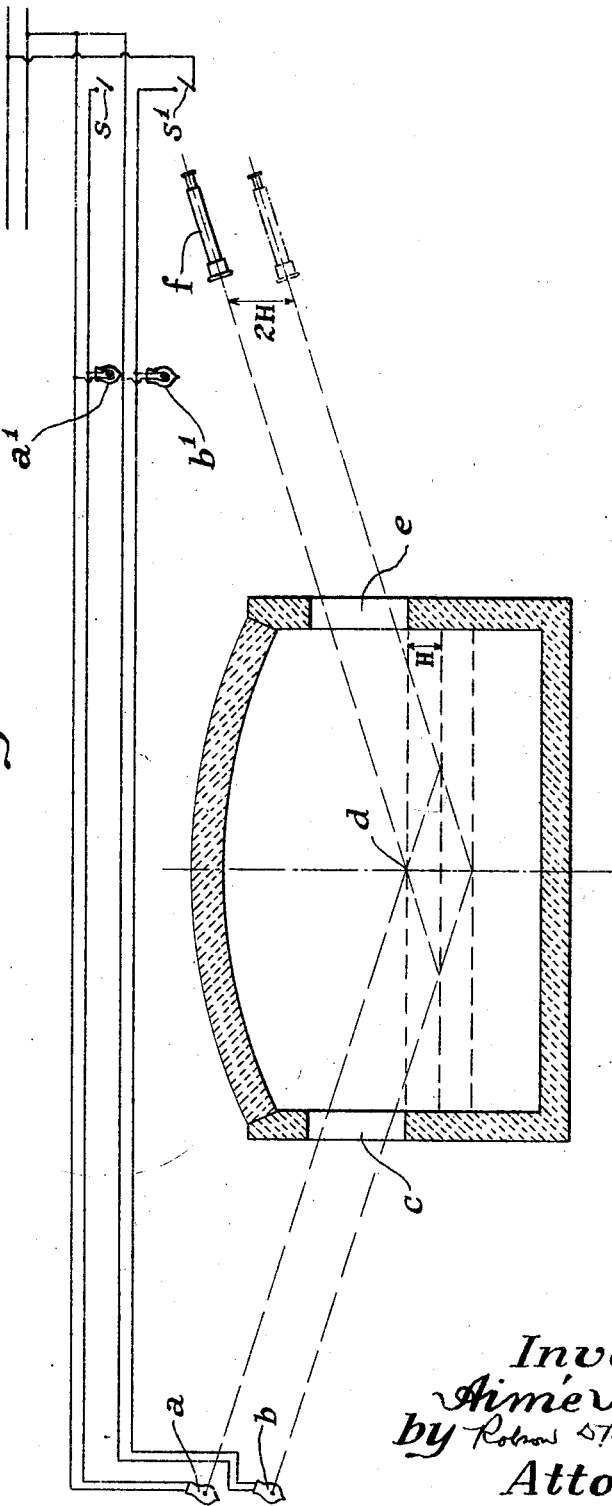
Figure 1 is a vertical assembly view, showing diagrammatically the structure employed.
Figure 2:
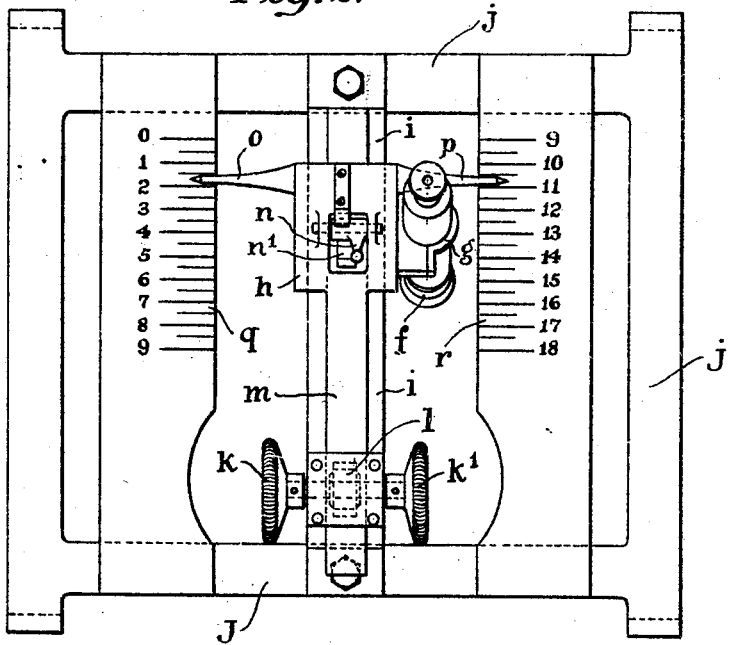
Fig. 2 is an elevational view of the carriage which carries the telescope.
Figure 3:
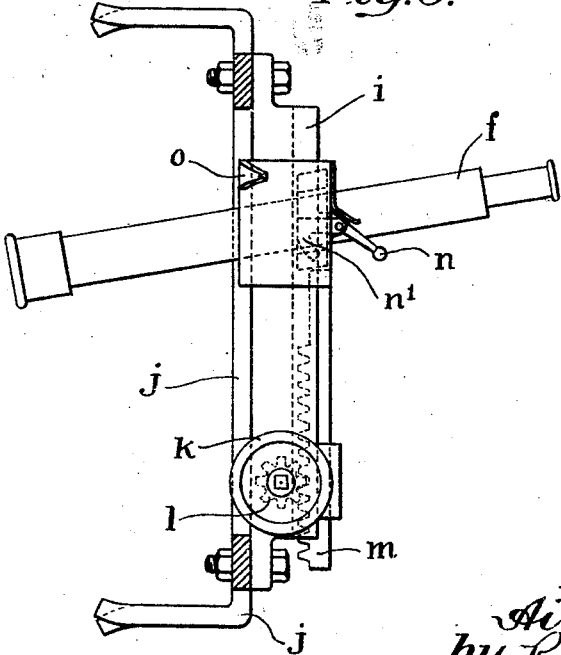
Fig. 3 is a side elevational view of the same carriage.

The operation is as follows:

The apparatus is so adjusted that, when the glass is at its highest level in the furnace and the telescope is brought to its uppermost position, the left-hand index $o$ is at zero of the corresponding scale $q$ and the lamp filament $a$ is seen coinciding with the cross hair of the telescope $f$. If the level of the glass decreases in the furnace, the telescope is slowly lowered by means of the knurled wheels $k$—$k^1$ until the lamp filament $a$ again coincides with the cross hair of the telescope. The telescope is fixed by means of the lever $n$ and the variation of the level of glass is read on the left-hand graduation. It is evident that, for a descent of the level of the glass equal to H in Fig. 1, the movement of the telescope is equal to 2H, which increases the precision of the reading.

For enabling the measurement of considerable variations in level, without increasing unduly the height of the sighting openings $c$ and $e$ of the furnace, a second lamp $b$ is arranged below the lamp $a$ at a distance equal to the left-hand scale of the telescope so that, when the level of the glass is measured with the lamp $a$ in service, and when the left-hand pointer is at the last figure of the left-hand graduation, the same level is measured with the lamp $b$ in service, the telescope being again raised so that the right-hand pointer is at the upper figure of the right-hand scale. It is thus possible to measure a new lowering of the level equal to that which can be measured by the first scale.

The lighting of the lamps $a$ and $b$ is controlled by switches $s$ and $s^1$ placed conveniently to the observer. Two signal lamps $a^1$ and $b^1$ indicate the lighting of the two lamps $a$ and $b$ without requiring the observer to leave the observing position.

It is evident that the invention is not limited either to the forms or to the details of construction which have just been described but that the invention may be modified in any way which does not alter its principle. Thus, instead of displacing the observing instrument, it is equally possible to leave the telescope fixed and to displace the light source along a graduated scale or, which amounts to the same thing, to successively light a series of lamps arranged along a scale. Also, instead of displacing the observing instrument parallel to itself, it may be displaced angularly.

I claim as my invention:

1. An apparatus for the precise determination of the level of the molten glass in a tank furnace comprising a source of light at one side of said furnace, an observing instrument at the opposite side of said furnace, said furnace having a pair of openings through one of which light from said source may pass thereinto and through the other of which the image of said light source may be observed by said instrument as reflected by the top surface of the molten glass, means for varying the relative positions of said source of light and said instrument in accordance with the level of glass, and means for determining the amount of such variation, whereby accurately to determine the level of the glass in said furnace.

2. An apparatus for the precise determination of the level of the molten glass in a tank furnace comprising a fixed source of light at one side of said furnace, a line-sight observing instrument at the opposite side of said furnace, said furnace having a pair of elongate openings through one of which the light from said source may pass thereinto and through the other of which the image of said light source may be observed by said instrument as reflected by the top surface of the molten glass, means for raising and lowering said instrument while maintaining it always parallel to itself, and a scale for determining the degree of the vertical movement of said instrument, whereby accurately to determine the level of glass in said furnace.

3. An apparatus for the precise determination of the level of molten glass in a tank furnace comprising a fixed source of light at one side of said furnace, a line-sight observing instrument at the opposite side of said furnace, said furnace having a pair of elongate openings through one of which the light from said source may pass thereinto and through the other of which the image of said light source may be observed by said instrument as reflected by the top surface of the molten glass, a pair of vertical guideways in which said instrument is mounted, means for adjusting the position of said instrument vertically in said guideways, a scale on one of said guideways, and an index on said instrument cooperating with said scale for directly determining the level of the glass in said furnace.

4. An apparatus for the precise determination of the level of the molten glass in a tank furnace comprising a plurality of fixed sources of light at one side of said furnace arranged vertically one above the other and arranged to be alternatively lighted, a line-sight observing instrument at the opposite side of said furnace, said furnace having a pair of elongate vertically extending openings through one of which the light from either of said sources may pass thereinto and through the other of which the image of either of said light sources may be observed by said instrument as reflected by the top surface of the molten glass, means for vertically adjusting the position of said observing instrument in accordance with the level of the glass, and a plurality of scales each cooperating respectively with one of said light sources for determining the level of glass in said furnace, whereby the scales may be used for different ranges of glass levels and a total wide range of levels may be determined without unduly elongating the observing openings or said scales.

5. An apparatus for the precise determination of the level of the molten glass in a tank furnace comprising a plurality of light sources arranged in a vertical row at one side of said furnace and arranged to be alternatively lighted, a line-sight observing instrument at the opposite side of said furnace, said furnace having a pair of elongate vertically extending openings through one of which the light from any one of said sources may pass thereinto and through the other of which the image of the light sources in operation may be observed by said instrument as reflected by the top surface of the molten glass, a pair of vertical guideways in which said instrument is mounted, means for vertically adjusting the position of said instrument in said guideways while maintaining its line of sight parallel to itself, a plurality of scales on said guideways one cooperating with each of said sources of light, an index on said instrument cooperating with said scales, means adjacent to said instrument for lighting any one of said light sources, and means also adjacent thereto for indicating which of said light sources is lighted, whereby the level of the glass in said furnace may be accurately determined by a single operator, and whereby the scales may be used for different ranges of glass levels and a total wide range of levels may be determined without unduly elongating the observing openings or said scales.

Signed at Paris this thirtieth day of July, 1926.

AIMÉ MATHÉ.